United States Patent [19]

Schwesig et al.

[11] 4,447,787

[45] May 8, 1984

[54] DEVICE FOR THE FIELD-ORIENTED OPERATION OF A CONVERTER-FED ASYNCHRONOUS MACHINE

[75] Inventors: Guenter Schwesig; Felix Blaschke, both of Erlangen, Fed. Rep. of Germany

[73] Assignee: Siemens Aktiengesellschaft, Berlin and Munich, Fed. Rep. of Germany

[21] Appl. No.: 292,614

[22] Filed: Aug. 13, 1981

[30] Foreign Application Priority Data

Sep. 11, 1980 [DE] Fed. Rep. of Germany ....... 3034252

[51] Int. Cl.³ .............................................. H02P 5/40
[52] U.S. Cl. .................................... 318/803; 318/805; 318/808
[58] Field of Search ................................. 318/803–807, 318/722, 723; 328/808–811; 324/158 MG

[56] References Cited

U.S. PATENT DOCUMENTS

| | | | |
|---|---|---|---|
| 3,593,083 | 7/1971 | Blaschke | 318/803 |
| 3,909,687 | 9/1975 | Abbondanti | 318/805 |
| 3,909,688 | 9/1975 | Blaschke et al. | 318/702 |
| 4,258,302 | 3/1981 | Plunkett | 318/723 |
| 4,388,577 | 6/1983 | Blaschke et al. | 318/803 |

*Primary Examiner*—David Smith, Jr.
*Attorney, Agent, or Firm*—Karl F. Milde, Jr.; Andrew G. Rodau

[57] ABSTRACT

Disclosed is an apparatus for operating a converted-fed asynchronous electric motor which comprises a flux computer for determining the position of the flux vector from the input values for the stator voltage provided by said motor by solving all the electrical quantities of the Park equations describing said motor in a given position of the rotor axis, taking into account the parameter values corresponding to the rotor resistance and the stator resistance of said motor whereby signals corresponding to the position of the flux vector and belonging to a solution, can be tapped from said flux computer; a converter control unit coupled to said flux computer and said convertor rectifier respectively, forming the control quantities for driving the converter rectifier from the determined position of the flux vector and from the nominal input values which fix the components of the stator current vector parallel and perpendicular to the flux vector.

16 Claims, 9 Drawing Figures

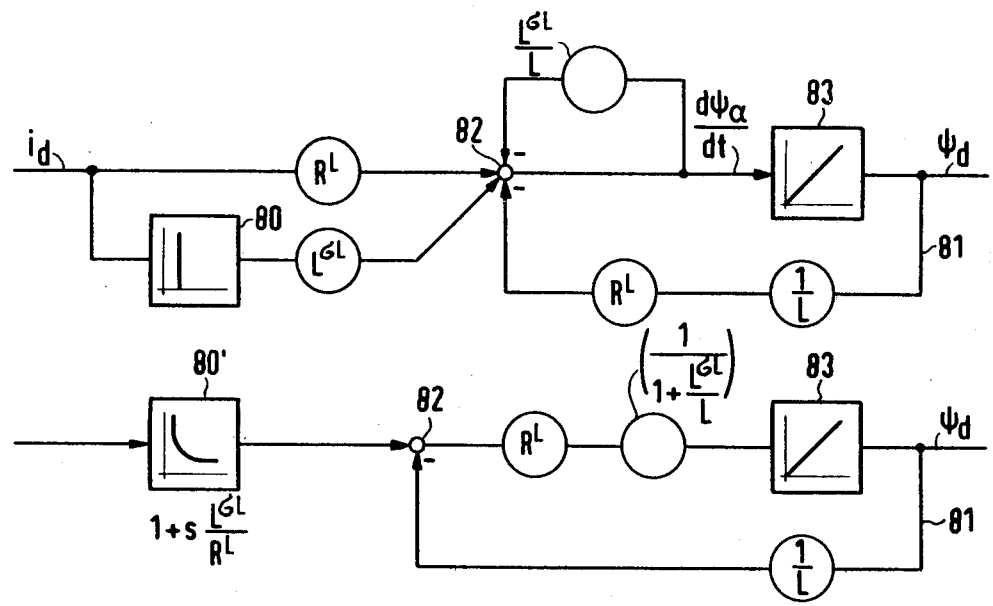
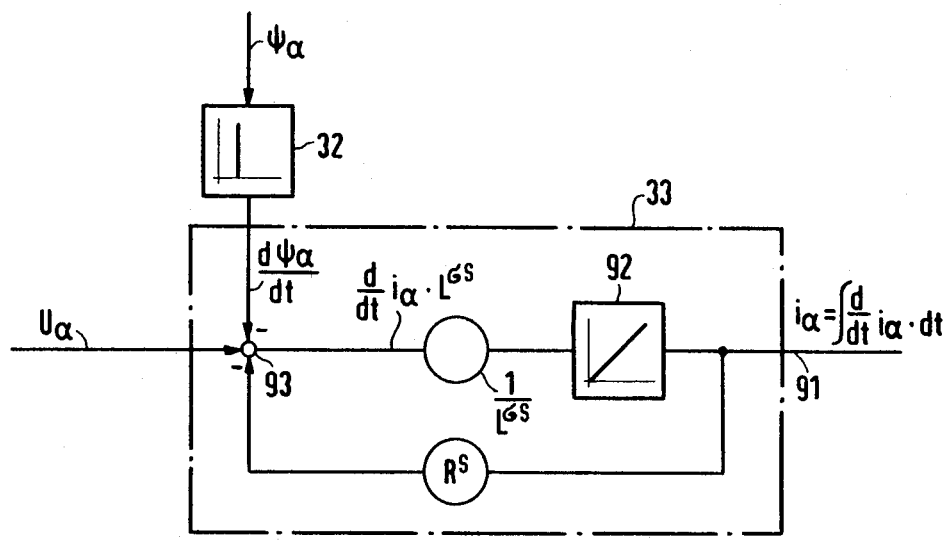
FIG 8
FIG 9

DEVICE FOR THE FIELD-ORIENTED OPERATION OF A CONVERTER-FED ASYNCHRONOUS MACHINE

BACKGROUND OF THE INVENTION

1. Field of the Invention

The present invention concerns an apparatus for operating a converter-fed asynchronous machine by a flux computer.

If the magnetic field in the asynchronous machine is described by a flux vector extending in the direction of the field axis, and if the currents flowing in the stator windings are assembled to a current vector, it is advantageous for converter-fed asynchronous machines to control the stator currents so that the flux is kept, e.g. at a constant value with the component of the stator current parallel to the flux vector (magnetizing current), and that a desired value of the torque or of the speed can be set with the component perpendicular to the flux vector (active current). Such a field-oriented operation is known from U.S. Pat. No. 3,824,437. Desired values are preset which fix the stator current vector in a ("field-oriented") coordinate system rotating with the flux vector in amount and angle, or in the Cartesian components. In order to obtain therefrom corresponding control quantities for the stator current to be supplied by the converter, the preset field-oriented nominal stator current vector must be transformed into the stationary reference system of the stator windings, which requires data about the position of the flux vector. The information can be obtained by a flux computer from the corresponding values of stator current and stator voltage. According to U.S. Pat. No. 3,593,083, this can be done by subtracting the ohmic voltage drop on the respective stator winding, which is given by the product of the current through the stator winding and the ohmic resistance, and the inductive voltage drop, which is given by the product of the respective stray inductance and the differentation of the line voltage with respect to time, from the star voltage of the machine terminal. On the winding, the emf appears from which the flux induced in the direction of the respective winding, is computed by integration. Just as the stator current, the stator voltages, the ohmic voltage drops, the stray voltages, the emf and the flux are vectorial quantities which can be assembled from the individual quantities belonging to the individual stator windings to a common vector. In a three-phase induction machine it is thus possible to determine two components of the emf vector or of the flux vector in a coordinate system formed of two winding axes enclosing an angle of 120 deg. by determining the emf or the flux. By means of a coordination transformer it is possible to change from this oblique-angled coordinate system to a corresponding stationary Cartesian coordinate system, which is designated with subscripts $\alpha$, $\beta$, in contrast to the field-oriented coodinates designated with subscripts $\rho 1$, $\rho 2$. The transformation can be effected at the output of the flux computer, but it can already be done during the determination of stator voltage, so that the stator current vector and the stator voltage vector in the oblique-angled or Cartesian coordinate system can be preset in the flux computer. It is also possible to effect the integration leading from the emf vector to the flux vector after the ohmic voltage drop has been subtracted from the stator voltage vector, and to subtract the product of the stray voltage and the stator current after the integration in order to take into account the inductive stray voltage. Such a flux computer is known, for example from German Patent No. 2,833,542 corresponding to U.S. Application No. 58,830 "Rotating-Field Machine Drive and Method".

This flux computer, which is based substantially on the stator voltage vector and forms the flux vector by integration of the emf, can be called a "voltage model". This model frequently meets the demands for accuracy and control dynamics in the operation of an asynchronous machine even without the exact knowledge of the stator resistance, provided the stator frequency of the asynchronous machine exceeds the rated frequency by about 10%. The voltage drop on the stator resistance is then negligible relative to the emf, so that an inaccurate determination and setting of the ohmic voltage drop has little effect on the flux determination. For lower frequencies, however, an exact determination of the flux depends on the accurate knowledge of the temperature-dependent stator resistance $R^S$. Furthermore, the open integration method used in the voltage model requires an elaborate, adaptive, DC-components control to avoid zero point drift, which leads at low frequencies to falsification of the flux determination, and also impairs the control dynamics in the upper frequency range.

SUMMARY OF THE INVENTION

Briefly the invention provides an apparatus for operating a converted-fed asynchronous machine which comprises a flux computer which computes the flux vector from the stator voltage vector and the rotor position angle by solving the electrical equations of the asynchronous machine. The parameter values for the stator resistance and rotor resistance are preferably tapped on regulators. The stator current magnitude, and the model current magnitude belonging to the computed flux, which depends on the rotor resistance parameter, are fed as deviations to the rotor resistance regulator and balanced if the rotor resistance parameter is set accurately. It is also possible to compute in an arithmetic model from the stator current vector, rotor position angle, and rotor resistance parameter, a model flux vector, on the one hand, and on the other hand in an emf former (52) the model vector associated with the actual emf vector. The model vector associated with the emf, and the actual vector are equal when the rotor resistance parameter is balanced to the actual rotor resistance. If the ohmic voltage drop is not taken into account in the formation of the actual emf vector, the stator resistance can be determined from the difference of the two vectors. For the operation of the machine, the component of the nominal current value parallel and perpendicular to the computed flux is given.

It is therefore an object of the invention to improve a device of the above-mentioned type by the use of a different flux computer in such a way that a better flux determination is obtained, even at low frequencies, as well as a higher dynamic accuracy in the entire frequency range.

While in the known flux computer only the emf vector of the machine is determined, and the flux is computed therefrom by integration, the differential equations for the stator current vector, stator voltage vector, emf vector, and flux vector are solved in the flux computer according to the invention, starting from the stator voltage vector and the angle of rotation of the rotor axis. As additional machine parameters are used in the flux computer parameter values for the main inductance and the stray inductance, which vary little however, and which are set independent of this invention. Instead of the stator current vector required in the known flux computer are used data on the position and movement of the rotor axis, so that it is not necessary to solve the mechanical portion of the Park equations, that is, equations which link the torque supplied by the electrical parameters with the mechanical torque of the machine and the rotation of the rotor. Synchronously, good agreement between model and machine regarding the dynamic range is obtained.

Since the parameter values for the stator resistance and the rotor resistance enter primarily into the solution of the differential equations, the accuracy of the model depends on the extent to which the parameters used in the model for the rotor resistance and stator resistance are in agreement with the corresponding machine parameters. It is therefore advantageous if the flux computer for the parameter value of the stator resistance and/or rotor resistance contains inputs for feeding-in adjustable parameter values.

For feeding-in rotor resistance parameter values which are in good agreement with the rotor resistance, it is advantageous according to one embodiment of the invention to tap from the flux computer quantity which determines the stator current vector determined in the solution of the equation. Since the stator current vector is a vector rotating perpendicularly to the axis of rotation, which is determined by the modulus and angle, or by its components in a given coordinate system, the component perpendicular or parallel to the fed-in stator voltage vector or particularly the magnitude of the stator current vector can be used with advantage as a defining quantity of the vector. From the stator currents tapped from the asynchronous machine is formed a corresponding quantity which determines the stator current vector of the machines. An the input for the parameter value of the rotor resistance is provided an integral controlling element to which the difference of the two defining quantities is fed.

This embodiment is based on the consideration that the same stator voltage vector is given for the machine and the flux computer. Consequently the same circle diagrams apply, only the slip scales are different if the machine and the model start from different rotor resistances. But since the actual rotation of the rotor is fed into the flux computer, the latter determines a model stator current vector that differs from the actual stator current vector. The parameter value for the rotor resistance varied by the integral regulator until the model stator current vector has caught up with the actual stator current vector. After the balancing of the stator current vectors, there is good agreement between the actual rotor resistance and the corresponding parameter value.

According to another embodiment of the invention, the parameter value for the rotor resistance is adjusted by making the emf vector of the machine follow a corresponding emf model vector. For the formation of the emf vector of the machine is used an emf detector, as it is known in the above-mentioned state of the art as a flux computer. This emf detector determines from the stator current and the stator voltage a quantity defining the emf of the machine. The emf vector is a plane vector, so that the magnitude or preferably the component parallel to the fed-in stator current vector, and particularly the component perpendicular thereto (reactive component) can be used as a defining quantity. Furthermore an arithmetic circuit is provided, which simulates the processes leading to the formation of the magnetic flux, which, starting from the stator currents, the rotor position of the machine, and an adjustable parameter value for the rotor resistance, computes a model flux vector. In a computer stage is formed the difference from the quantity defining the machine emf, and from the quantity derived from the model flux vector defining the respective emf of the model. The difference of these quantities is fed to a rotor parameter controlling unit, whose output is fed, on the one hand, to the input for the rotor resistance parameter value of the arithmetic model circuit, and on the other hand to the input for the rotor resistance parameter value of the flux computer.

This embodiment is based on the fact that the same stator current vector is given for the arithmetic model circuit and for the machine, therefore congruent circle diagrams are valid which differ only in the slip scale, which depends on the rotor resistance. Since the angle of rotation of the machine rotor is also impressed on the arithmetic model, the arithmetic model circuit determines a model emf-vector for the given slip which deviates from the emf vector of the machine if a parameter value deviating from the rotor resistance of the machine is fed into the arithmetic model circuit for the rotor resistance. The rotor resistance-parameter value of the arithmetic model is now varied so long until the emf model vector has caught up to the machine emf vector. After balancing, the parameter value used in the arithmetic model is in good agreement with the rotor resistance of the machine. The value appearing on the rotor resistance parameter regulator can therefore be fed into the flux computer as a rotor resistance parameter value.

An emf model vector is preferably formed in the arithmetic stage by differentiation of the model flux vector. The emf vector formed by the detector and the emf model vector are fed to a device which contains at least one vector analyzer for forming the magnitude and a subtractor for forming the difference of the magnitude of the vectors. But the device can also contain, in addition to the subtractor, at least one vector rotator instead of a vector analyzer. To the vector rotator is fed a signal formed by a vector analyzer from the stator current vector, which describes the position of the stator current vector in the stationary reference system. The vector rotator then transforms the coordinates of the fed-in vector quantities of the stator reference system (subscripts $\alpha, \beta$) into a reference system rotating with the stator current vector. (subscripts j1, j2). The device therefore supplies two coordinates which correspond to the vectorial difference of the machine emf-detector and of the emf model vector in the reference system rotating with the stator current. In order to balance the emf-vector, one of these coordinates is then used in this rotating reference system. Preferably the component perpendicular to the stator current is used (reactive component). The reactive component of the machine emf vector is always equal to the reactive component of a summation vector from the emf vector and ohmic voltage drop, since the ohmic voltage drop is only a drop of the active voltage, and represents therefore a vector parallel to the stator current. This summation vector can be formed in a simple manner by subtracting in the emf detector from the stator current vector only the inductive stray voltage drop, that is, the product of stray inductance by the derivative of the stator current with respect to time. The reactive component of this summation vector is fed to the regulator as the quantity defining the emf vector together with the reactive component of the emf model vector defining the emf model vector.

The fact is utilized that the component parallel to the stator current vector (active component) of the summation vector differs from the active component of the machine emf vector (or after balancing, from the active component of the emf model vector) only by the ohmic voltage drop, hence the product of stator resistance by the magnitude of the stator current vector. Consequently the magnitude of the stator current vector is formed with the vector analyzer determining the angular position of the stator current vector and applied to the divisor input of a divider. At the same time the active component of the vectorial difference is computed by the vector rotator, which performs the coordinate transformation of the difference from the machine emf vector and the emf model vector. This active component of the vectorial difference is fed to the dividend input of the divider, so that its output supplies at the same time a balance parameter valued for the stator resistance, after the active component of the emf has been balanced.

This embodiment requires, in addition to the flux computer, an emf-detector and an arithmetic model circuit, and is therefore rather elaborate, but it is characterized by great accuracy and good dynamic range. For lesser requirements it may be advantageous to provide for the determination of the stator resistance at the flux computer input for the corresponding parameter value a computing element which is fed by the stator temperature and which forms a temperature-dependent rotor resistance parameter value by correcting an output value, set independent of the temperature, with a temperature-correcting function stored in the computing (unit) element. The temperature of the stator winding can be taken into consideration in a simple manner by multiplying the temperature-independent output value by the stator winding temperature.

For a full understanding of the present invention, reference should now be made to the following detailed description of the preferred embodiments of the invention and to the accompanying drawings.

DESCRIPTION OF THE DRAWINGS

FIG. 8 illustrates schematically corresponding circuits to the block diagram shown in FIG. 1 according to the invention.

FIG. 9 illustrates a block diagram of the current computing units used on flux computer according to the invention.

DESCRIPTION OF THE PREFERRED EMBODIMENT

Figure 1:
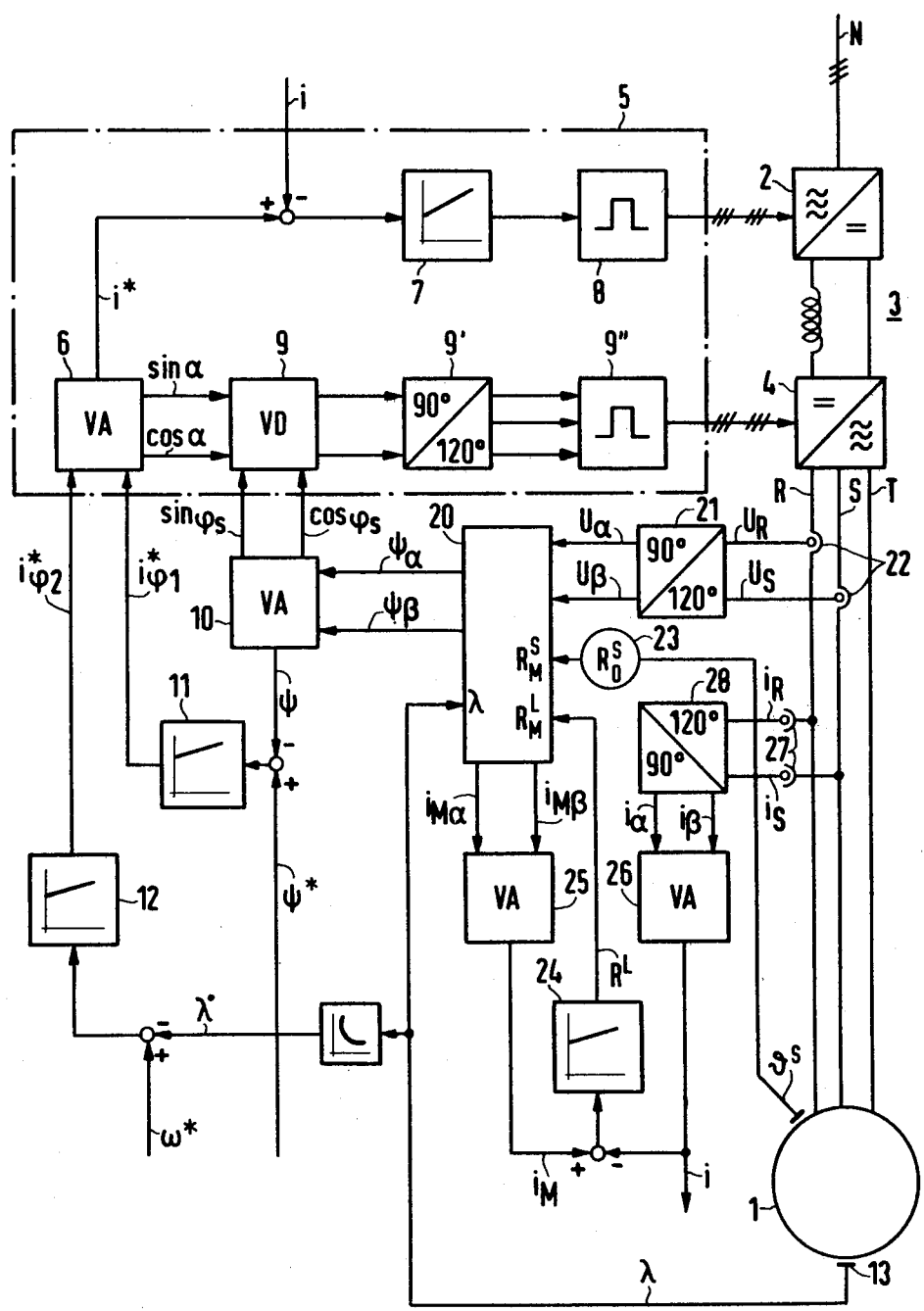
FIG. 1 illustrates a block diagram of an apparatus for operating a converted-fed asynchronous machine with a flux computer according to the invention.

According to FIG. 1, an asynchronous machine 1 is fed from a three-phase mains N over a converter which consists of a mains-guided rectifier 2, an intermediate circuit 3 with impressed intermediate circuit current, and a self-guided inverter 4. For firing the converter rectifiers is provided a converter control 5 in which the nominal vector i* of the stator current is preset by feeding-in separately the component i* $\phi$1 parallel to the field axis (magnetizing current) and the component i* $\phi$2 perpendicular thereto (A vector analyzer 6 determines therefrom the magnitude i* $\phi$2 of the nominal vector, which is compared with the actual value of the stator current magnitude i and fed into a current regulator 7, to supply from the deviation a control quantity for the ignition control device 8 of rectifier 2. Vector analyzer 6 supplies also the projections of a unit vector on the two field-oriented coordinate axes, where the unit vector as the control vector describes the position of the nominal vector i* of the stator current in the field-oriented coordinate system, which is turned by the flux angle $\phi$s relative to a stationary Cartesian reference system (stator reference system). The projections sin $\alpha$, cos $\alpha$ of this unit vector are transformed into the stator reference system by means of a vector rotator 9 to which are fed projections sin $\phi$s, cos $\phi$s of a unit vector pointing in the direction of the field axis. These angle data are tapped over the position of the field axis on a vector analyzer 10, to which the components $\psi\alpha$, $\psi\beta$ of the flux vector $\psi$ in the stator reference system are fed.

These vector analyzers, vector rotators and coordinate transformers are described, e.g. in U.S. Pat. No. 3,775,649, FIG. 3 Vector rotator, FIG. 7 vector analyzer, FIGS. 4, 5 coordinate transformer. At the output of vector rotator 9 appear now the components of the control vector in the Cartesian stator reference system, from which the components of three axes parallel to the stator winding axes, which are staggered by 120° C., are formed in a coordinate transformer 9'. Coordinate transformer 9' supplies thus the control voltages for the ignition control device 9'' of the self-guided inverter 4.

Since the field-parallel component i* $\phi$1 determines the value of the flux over the magnetizing current, the nominal value i* $\phi$1 for the magnetizing current can be formed in a controlled operation of the asynchronous machine by a flux regulator 11, to which the deviation between the nominal flux value $\psi$* and the magnitude of the flux vector $\psi$ formed on vector analyzer 10 is fed. The torque or the speed of the asynchronous machine can be controlled over the nominal value i* $\phi$2, of the stator component perpendicular to the field (active current), can be formed to which end a speed governor 12 is provided, for example, which forms the active current necessary for the adjustment of the nominal speed from the deviation between a given nominal speed $\omega$* and a corresponding actual value, the derivative $\lambda$ with respect to time, of the rotor position tapped over a rotor position transmitter 13 (load angle $\lambda$.

According to the invention, the angle date (sin $\phi$s and cos $\phi$s) are supplied by a flux computer 20 over the flux vector. Into flux computer 20 is fed the angle λ of the rotor axis tapped on the rotor position transmitter 13, as well as the stator voltage vector U. The stator voltage vector U is given in the embodiment according to FIG. 1 in the form of two components Uα, Uβ in the Cartesian stator referency system which are tapped by means of a coordination transformer 21 from corresponding voltage converters on two machine feed lines R, S. Principally the stator voltage vector U can also be given another coordinate system, e.g. a rotor-related coordinate system, since corresponding arithmetic modules for coordinate transformation are available. Instead of the actual values can also be used the nominal values with good control and operation of the asynchronous machine by impressed voltage.

The equation system to be solved in the flux computer reads:

A magnetizing current $i_\mu$ is formed in the Park equation system to be solved in the flux computer from the stator current i and the rotor current $i^L$ $$i_{82} = i + i^L$$

Corresponding to the main inductance L, the stator stray inductance $L^{\sigma s}$, which is simply called stray inductance $L^\sigma$ in this application and the rotor stray inductance, the magnetizing current leads to the formation of a flux $\psi^s$ in the stator and of a flux $\psi^L$ in the rotor.

$$\psi^s = L i_\mu + L^{\sigma s} i^s \quad (2)$$

$$\psi^L = L i_\mu + L^{\sigma L} i \quad (3)$$

These vector equations are valid in any coordinate system because of the invariance of the vector addition. The conversion of the current coordinates given in the stator-related system (subscripts α, β), into a coordinate system rotating with the rotor (rotor position angle λ) is given by a corresponding rotary matrix D (λ).

$$i_{\mu\alpha\beta} = D(\lambda) \cdot i_{\mu d,q} \quad (4)$$

$$i_{\alpha,\beta} = D(\lambda) \cdot i_{d,q} \quad (4')$$

But the differentiation of the fluxes $\psi^s$ and $\psi^L$ with respect to time enter into the equations for the voltages on the stator and rotor windings in the form of the induced emf. These equations are no longer invariant with regard to coordinate transformations. Rather the following equation applies to the stator voltage sector u in the stator-related coordinate system.

$$u_{\alpha,\beta} = i_{\alpha,\beta} \cdot R^s + \frac{d}{dt} \psi^s_{\alpha,\beta} \quad (5)$$

The voltage equation for the squirrel cage rotor of the asynchronous machine in the rotor reference system can be described in a similar manner and we have:

$$0 = i^L_{d,q} \cdot R^L + \frac{d}{dt} \psi^L_{d,q} \quad (6)$$

The air gap flux (main flux) $\psi$ can be introduced by $$\psi = L \cdot i_\mu \quad (I)$$

so that the following equations follow from (5) or (6) and (2).

$$u_{\alpha,\beta} = R^s \cdot i_{\alpha,\beta} + L^{\sigma s} \frac{d}{dt} i_{\alpha,\beta} + \frac{d}{dt} \psi_{\alpha,\beta}, \quad (II)$$

$$0 = R^L \cdot i_{d,q} + L^{\sigma L} \frac{d}{dt} i_{d,q} + \frac{d}{dt} \psi_{d,q} \quad (III)$$

where $$-i^L_{d,q} = -\frac{\psi_{d,q}}{L} + i_{d,q} \quad (I')$$

These equations are well known.

Corresponding equations are also indicated, e.g. in "Siemens-Forsch. u. Entw. Ber." no. 1/1972, p. 184, equations 2-6. Equations 1 and 7 formulated there which describe the electric torque of the machine and the computation of the angular speed of the rotor by linking the electrical and mechanical torque, are not required since the necessary data on the angular speed of the rotor are fed into the flux computer over the rotor position λ. Corresponding equations also result from the equations given for the general case (synchronous machine) in the rotor reference system in "Siemens Forsh. u. Entw. Ber." no. 1/1972, p. 157–166, where a circuit for the solution of these differential equations is also indicated which can be applied to the requirements of flux computer 20 used here. In this circuit is provided a mechanical part to compute the rotor position by linkage with the electric torque. In the flux computer according to the invention such a mechanical part is not required, it is replaced by direct input of the rotor position angle.

Figure 2:
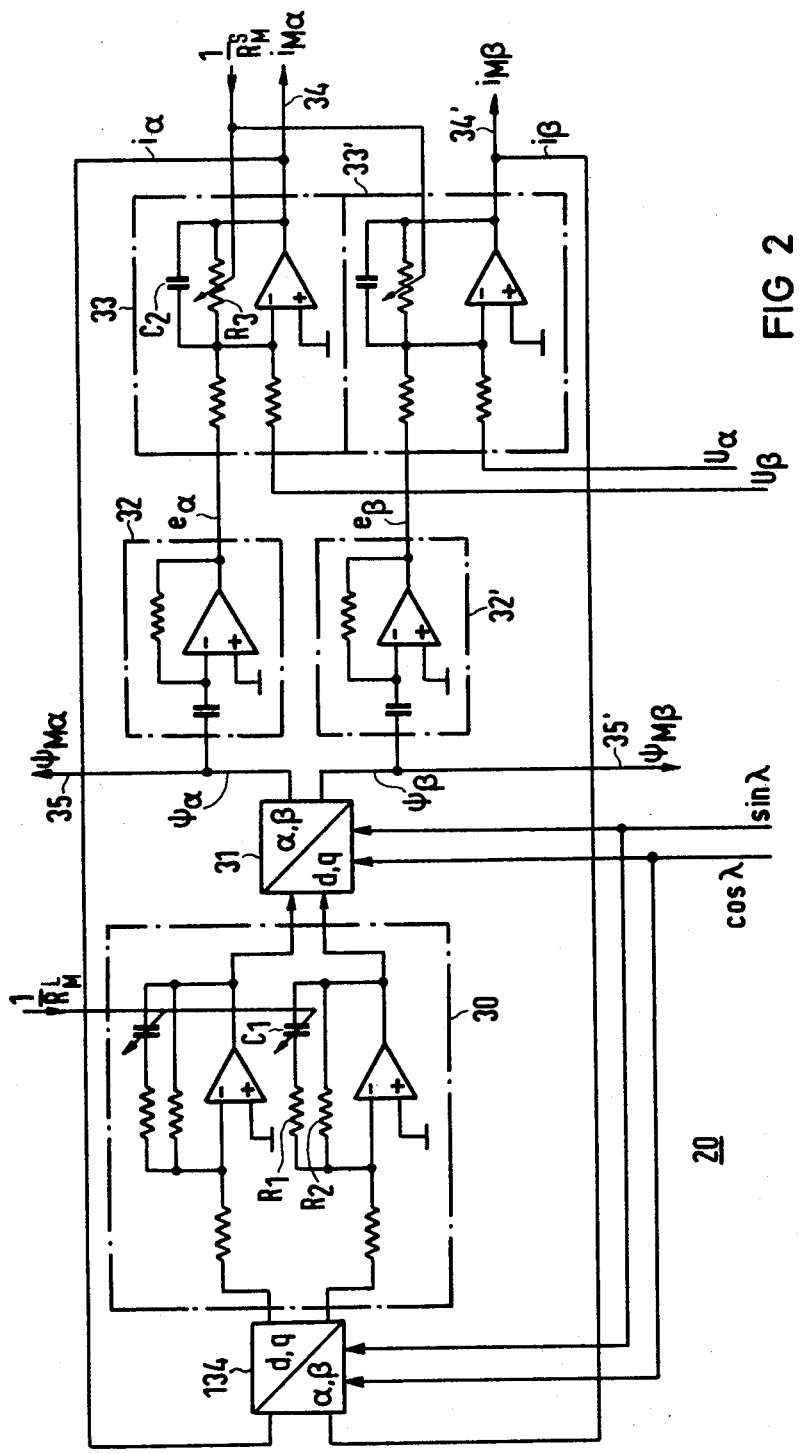
FIG. 2 illustrates a block diagram of a flux computer according to the invention.

FIG. 2 shows schematically the internal structure of the flux computer 20.

In this circuit, vector ψ in the rotor-related coordinate ψd, ψq, is computed in a flux computing unit 30 corresponding to (I') and (III), and subsequently converted to stator-related coordinates ψα, ψβ corresponding to the input angle functions sin λ, cos λ of the rotor position angle λ (coordinate transformer 31). In differential units (32, 32') is computed therefrom the respective stator-related component eα, eβ of the emf vector e=(d/dt) ψ, and the stator-related component of the stator current vector i is determined in current computing units (33, 33'). For feeding into the flux computing unit 30, these stator-related components iα, iβ are transformed again in a coordinate transformer 134 into the rotor reference system, in which the flux computing element works.

In order to facilitate the understanding of the circuit of the flux computing element 30 indicated in FIG. 2, (III) and (I') are combined here to $$\frac{d\psi d}{dt} = -\frac{R^L}{L} \cdot \psi_d + R^L \cdot i_d - \frac{L^{\alpha L}}{L} \frac{d}{dt} \psi_d + L^{\sigma L} \frac{d}{dt} i_d = \quad (7)$$

$$R^L \cdot i_d + L^{\sigma L} \cdot \frac{d}{dt} i_d - \frac{R^L}{L} \frac{d}{dt} \psi_d - \frac{L^{\sigma L}}{L} \frac{d}{dt} \psi_d$$

The upper part of FIG. 8 shows schematically a corresponding circuit where the first two products of the right side are formed from $i_d$ by means of a differentiating element 80 and corresponding proportional elements $R^L$, $R^{\sigma L}$ and the third product from the inverted output quantity ψd by means of a proportionality-laden feed through line 81 (factors 1/L, $R^L$). These three products, as well as a fourth product are fed to a summation point 82, so that the complete equation is at the sum output, when the fourth product is formed after multiplication with $L^{\sigma L}/L$ and inversion from the aggregate signal $(d\psi d/dt)$. The aggregate signal yields by integration the desired flux component $\psi d$.

The bottom part of FIG. 8 shows a simplification of this circuit, where instead of the differentiating element 80 a time function element 80' is used with the time behavior $$\left(1 + S \cdot \frac{L^{\sigma L}}{R}\right)$$

(S=operator of the Laplace transformation). This circuit can be described by the following relations, which are obtained by Laplace transformations:

$$S\frac{\psi_d}{R^L}\left(1 + \frac{L^{\sigma L}}{L}\right) = -\frac{\psi_d}{L} + i_d / \left(1 + S \cdot \frac{L^{\sigma L}}{R^L}\right), \quad (8)$$

$$\psi_d\left(\frac{1}{L} + \frac{S}{R^L}\left(1 + \frac{L^{\sigma L}}{L}\right)\right) = i_d\left(1 + S\frac{L^{\sigma L}}{R^L}\right),$$

$$\psi_d = i_d \frac{1 + S \cdot L^{\sigma L}/R^L}{1/L + S \cdot (1 + L^{\sigma L}/L)/R^L}$$

These relations lead to a circuit indicated in FIG. 2, if $R_1$ is proportional to L, R2 proportional to $L^\sigma$, and C1 proportional to $1/R^L$. The same holds true for component $\psi_q$.

For calculating the current components $i\alpha$, $i\beta$ are used flue computing units 33 (smoothers), 33', because equation (II) can be transformed to $$L^\sigma \cdot \frac{d}{dt} i_\alpha = u_\alpha - \frac{d}{dt} \psi_\alpha - R^S \cdot i_\alpha \quad (9)$$

For the representation can be used a circuit according to FIG. 9, where the component $-e\alpha=(d/dt)\psi\alpha$ tapped from differentiating unit 32. The input quantity $u\alpha$, as well as the output quantities $i\alpha$ tapped on output 91 on an integrator 92 are fed after amplification (factor $R^S$) and inversion—to a summation point 93, where the aggregate signal is fed to the integrator input. By simplification we obtain the circuit shown in FIG. 2. The stator stray inductance $L^{\sigma s}$ is represented by capacitor C2, and the reciprocal stator resistance by resistor R3. This design of the flux computer for the solution of the differential equations of the asynchronous machine is known from the indicated state of the art. For the invention, capacitors C1 and resistors R3 are variable proportionally to $$\frac{1}{R_M{}^L} \text{ and } \frac{1}{R_M} S,$$

so that they can be adapted to the true machine parameters $R_L$ and $R^S$. Futhermore the values of the current components $i\alpha$, $i\beta$ calculated in the flux computer and/or the flux components $\psi\alpha$, $\psi\beta$, can be led out at the outputs 34, 34' and 35, 35' respectively. The current components represent values $i_M\alpha$, $i_M\beta$, which correspond to the parameter setting $R_M{}^L$, $R_M{}^S$ of the flux computer. The angle signals sin $\phi s$ and cos $\phi s$ can then be formed by vector analyzer 10 (FIG. 1) from the flux components $\psi_M\alpha$, $\psi_M\beta$, which represent the angle $\phi s$ between flux axis and $\alpha$ axis of the stator reference system. If the parameters values $R_M{}^L$ and $R_M{}^S$ of the flux computer are set sufficiently accurately to the machine parameters $R^S$ and $R^L$. It must be kept in mind, however, that the flux computer uses additional parameters, e.g. L, $L^{\sigma L}$, and $L^{\sigma S}$, which must likewise be set with sufficient accuracy for exact position determination of the flux vector.

The flux vector $\psi$ calculated in flux computer 20 described the flux of the machine the more accurately the more the parameter values $R_M{}^S$ for the stator resistance and $R_M{}^L$ for the rotor resistance are in agreement with the corresponding resistance values of the asynchronous machine. For this reason inputs are provided in flux computer 20 in order to set the parameter values to the corresponding machine values.

In many cases it is necessary to consider the temperature dependence of the stator resistance $R^S$ of the machine. In the embodiment of FIG. 1, this is done by feeding-in a temperature-dependent value which is obtained by multiplying an output value $R_O{}^S$, which is set to the stator resistance at a certain reference temperature, by a correcting function of the stator winding temperature $\theta S$. In some cases it suffices to connect the input for $R_M{}^S$ in series with a multiplier 23 in which the output value $R_O{}^S$ is multiplied by the stator temperature $\theta S$.

For feeding-in a rotor resistance parameter value $R_M{}^L$ turned to the rotor resistance $R^L$ of the machine, an identification circuit is connected in series with the corresponding input of the flux computer 20. This identification circuit is based on the fact that the same vector for the stator voltage is given for the machine and the flux computer. Consequently, congruent circle diagrams apply to the flux computer and the machine, and only the slip scale for $R^L \neq R_M{}^L$ is different.

Figure 3:
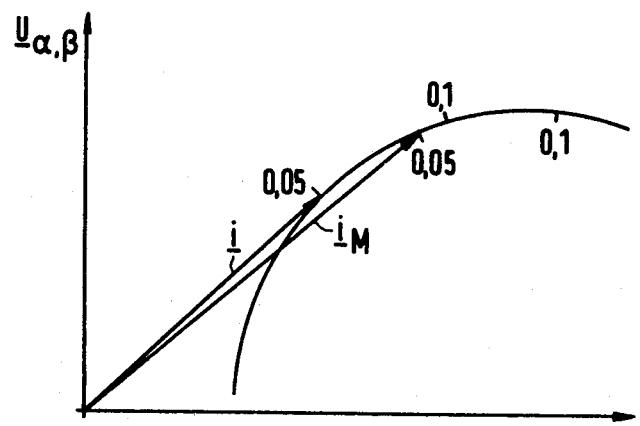
FIG. 3 illustrates a circle diagram of the stator current vector of the asynchronous machine and of the respective stator current vector of the model.

FIG. 3 shows the circle diagram where the scale provided on the outside of the circle applies to the machine, that on the inside to the model in the case $R_M L > R^L$. To the stator current i of the machine shown in FIG. 2 belongs the slip 0.05. By feeding-in the rotor position, the same slip 0.05 has been fed into flux computer 20, so that the computed stator current $i_M$ is obtained in the flux computer. In the identification circuit, the fed-in rotor resistance—parameter $R_M{}^L$ is now varied so long until $i=i_M$ and thus also $R^L=R_M{}^L$. For the realization of this principle, an integral regulator 24 is provided at the input for $R_M{}^L$ of the flux computer, to which is fed a defining quantity of the stator current vector i and model stator current vector $i_M$, which is computed in the flux computer in the solution of the corresponding differential equations. As a defining quantity can be used particularly the values i and $i_M$ of the stator current and of the model stator current determined in the flux computer. For $R^L-R_M{}^L>0$ we have always $i-i_M>0$. Only at very low frequencies and very low slips the monotony between $i-i_M$ and $R^L-R_M{}^L$ is disturbed, so that in these extreme operating states a sign reversal must be taken into consideration.

The magnitude $i_M$ of the stator current vector $i_M$ computed in the flux computer can be formed in a simple manner by a vector analyzer 25, to which the coordinates $i_M\alpha$, $i_M\beta$, determined in the stator reference system, are fed. In analogy the magnitude i of the stator current i of the machine is determined by means of a vector analyzer 26 to which the Cartesian coordinates $i\alpha$, $i\beta$ of the machine current are fed. These Cartesian components are formed in this way that the machine currents $i_R$, $i_S$ are tapped in two machine lines R, S by means of current transformers 27 and transformed in a coordinate transformer 28 into the Cartesian stator reference system (FIG. 1).

Figure 4:
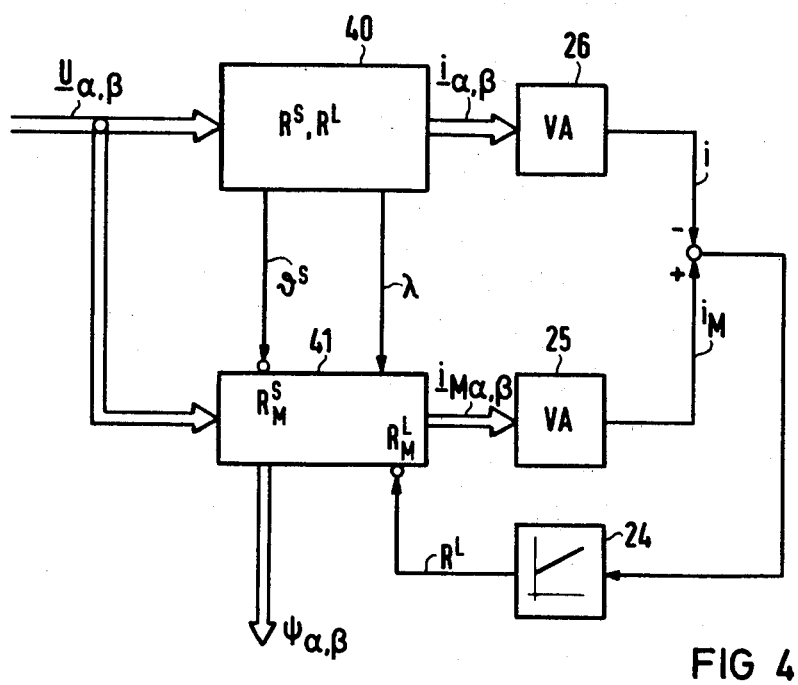
FIG. 4 illustrates a block diagram of the apparatus according to FIG. 1 in a simplified representation.

In FIG. 4 the nature of the circuit according to FIG. 1 is repeated in a simplified representation. 40 denotes the system converter/machine, the double arrow U $\alpha,\beta$ representing the stator voltage vector to indicate that these are the two components of a vector in the stator reference system. This stator voltage vector is also fed into flux computer 41, which also receives from the machine information about the stator winding temperature $\theta^S$ (that is, the temperature correction for the set stator resistance parameter values $R_M{}^S$) and the rotor position $\lambda$. Flux computer 41 supplies the information on the position and size of the flux vector, likewise symbolized by a double arrow $\psi\alpha, \beta$ which is required by the converter control. The rotor resistance-identification circuit consists substantially of the above-described vector analyzers 25 and 26 and of the integral regulator 24, and the two stator current vectors are again symbolized by double arrows i $\alpha\beta$ and $i_{M\alpha\beta}$.

Figure 5:
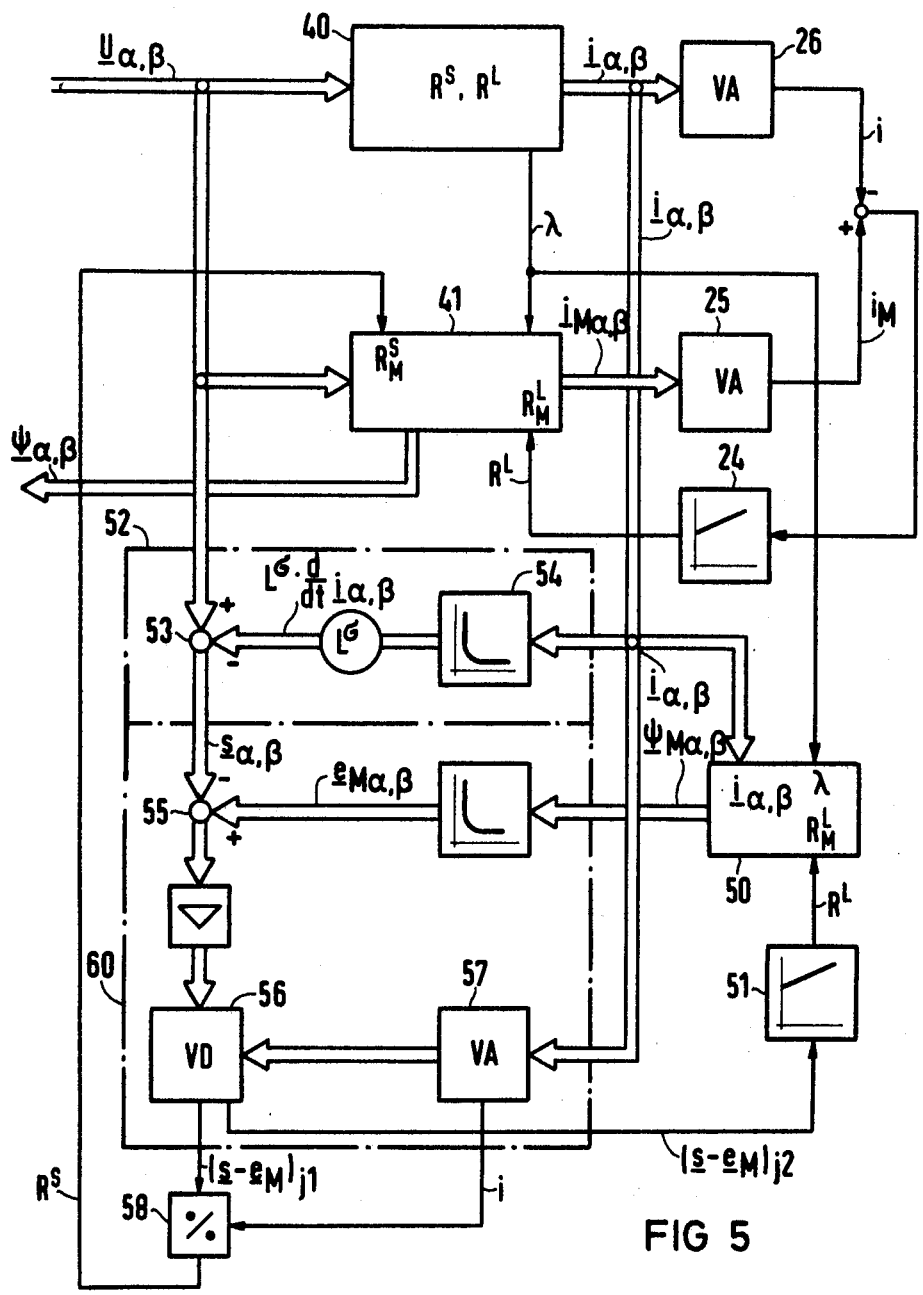
FIG. 5 illustrates a block diagram of an apparatus according to FIG. 1 which comprises a circuit for identifying the motor resistance and/or the stator resistance of the asynchronous machine based on the use of a "current model".
Figure 6:
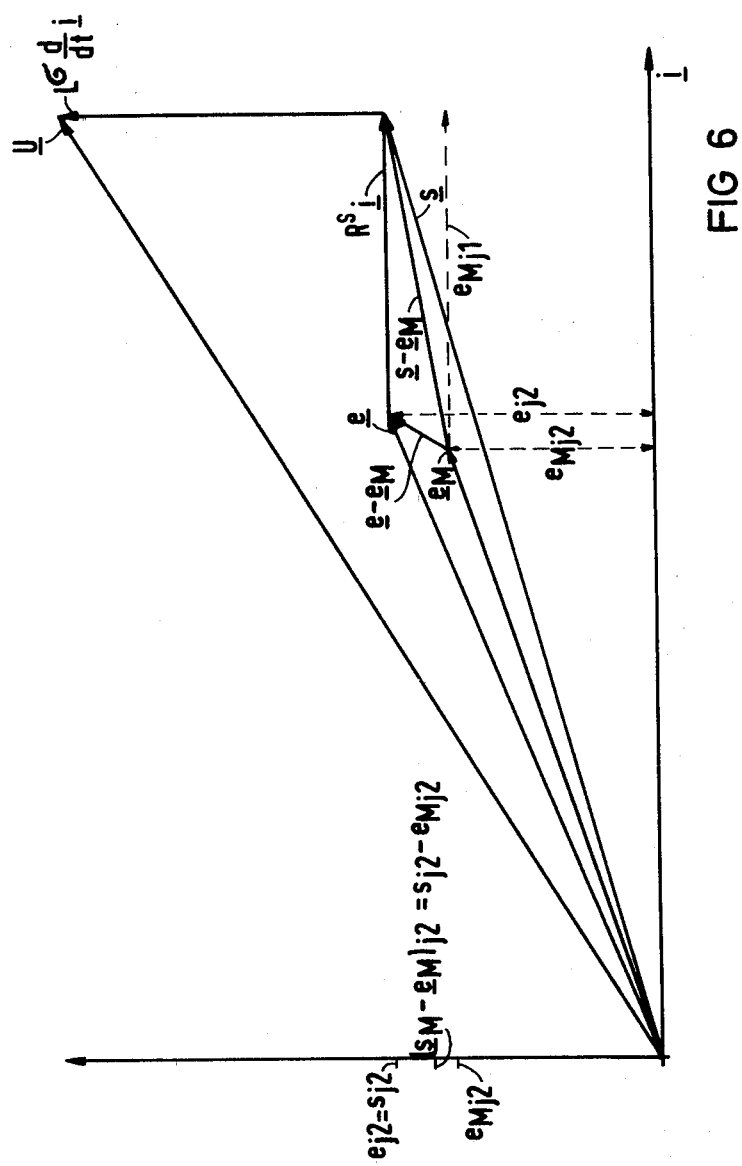
FIG. 6 illustrates a vector diagram of the vector used in FIG. 5.

The embodiments according to FIGS. 5 and 6 concern another circuit for identifying the rotor resistance and/or the stator resistance of the asynchronous machine, which is based on the use of an arithmetic model circuit 50 called a "current model". This current model for identifying the rotor resistance and, if necessary, the stator resistance is described in the co-pending U.S. patent application, "Method and Device for Determining the Rotor Resistance of an Asynchronous Machine".

Arithmetic model circuit 50 starts from the stator current vector i impressed on the asynchronous machine, and uses as additional information the rotor position angle $\lambda$ topped on the asynchronomous machine. Into the current model is likewise fed a rotor resistance parameter value $R_M{}^L$, and by means of this parameter value a model vector for the flux vector of the machine is computed in a model circuit simulating the dynamic processes in the asynchronous machine. Since the same stator current vector is impressed in this case on the asynchronous machine and on current model 50, we obtain here too congruent circle diagrams with different slip scales for the case $RM^L \neq R^L$. But since the actual rotor position, and thus the actual slip is present at any time in the current model, the model flux vector $\psi_M$ differs from the actual flux vector $\psi$. Likewise the model emf vector $e_M$ resulting from the model flux vector by differentiation differs from the emf vector e of the machine. Consequently a rotor resistance parameter regulator 51 is connected in series with the input of the current model for the rotor resistance parameter value, to which the deviation between a quantity defining the emf vector e of the machine and a corresponding quantity defining the model emf vector $e_M$ is fed. By means of regulator 51, the rotor resistance parameter value $R_M{}^L$ is now varied until the two emf vectors e, $e_M$ coincide, that is, the difference of the defining quantities disappears at the regulator input. At the regulator output appears then a value which corresponds with sufficient accuracy to the rotor resistance $R^L$.

Principally it is possible to use instead of the emf vectors the corresponding flux vectors for balancing on regulator 51. To this end the flux vector $\psi$ of the machine can be formed by means of an emf detector from the stator voltage vector U by subtraction of the ohmic voltage drop and the inductive stray voltage, and by integration. In a following arithmetic circuit the difference between the two quantities defining the respective vectors $\psi$, $\psi_M$ is then formed and fed to regulator 51. If the magnitudes of the vectors are used as defining quantities, the components of the vectors are fed to a vector analyzer, and the values of the vector magnitudes in the vector analyzers are fed to a subtraction stage.

It is simpler to start the balancing of the rotor resistance not from the flux vectors, but from the emf vectors. The arithmetic circuit contains then a differentiating stage in order to obtain the model emf vector $e_M$ by differentiating the model flux vector $\psi_M$ component wise. But the circuit according to FIG. 5 does not start from the magnitudes of the emf vector, but from their components perpendicular to the stator current vector i (reactive components, index j2). Since the ohmic voltage drop is a pure active voltage drop and therefore represents a vector pointing in the direction of the stator current vector, the ohmic voltage drop does not contribute to the reaction component of the emf vector. This results in a simplification for the emf detector, which permits at the same time identification of the stator resistance of the machine.

According to FIG. 5, the vector of the inductive stray voltage is subtracted in emf detector 52 from the stator voltage vector U component wise. (subtraction point 53). The inductive stray voltage vector is obtained by component wise differentiation (differentiating stage 54 of the stator current vector and multiplication by a parameter $L^\sigma$ describing the stray inductance of the stator windings. Since the subtraction of the ohmic voltage drop necessary for computing the emf is foregone in the emf detector 52, the emf detector supplies instead of the Cartesian, stator-related components of the emf vector the corresponding components s$\alpha$, S$\beta$ of the summation vector s from the emf vector and the vector of the ohmic voltage drop (FIG. 6). Since the Cartesian components of a difference vector from two vectors is equal to the differences of the corresponding components of the vectors, the difference of the reactive components to be fed into regulator 51 is formed of s and $e_M$ by forming first the difference vector s$-e_M$ by component wise subtraction (subtraction point 55). After amplification, the Cartesian components of this difference vector are superimposed upon a vector rotator 56, which transforms this vector into a coordinate system revolving with the stator current vector. To this end the quantities sin $\gamma$, cos $\gamma$ are fed to the vector rotator, where $\gamma$ denotes the direction of the stator current vector in the Cartesian stator reference system. This information is formed over the direction of the stator current vector by a vector analyzer 57, to which the Cartesian components i$\alpha$, i$\beta$ of the stator current vector of the machine are fed. Vector analyzer 57 also computes the magnitude i of the vector stator current, which is fed to the divisor input of a divider 58.

Figure 7:
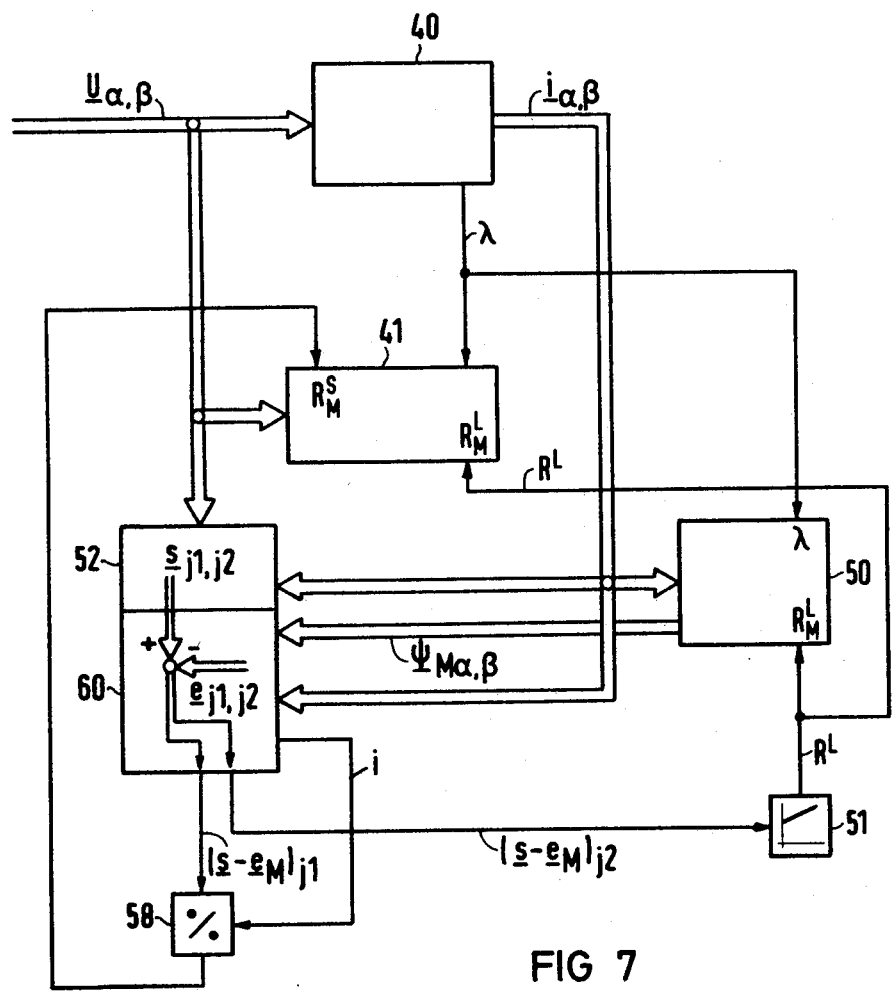
FIG. 7 illustrates a block diagram of an apparatus according to the invention wherein the identified rotor resistance value is fed to the flux computer and to the arithmetic model circuit as well.

At the output of the vector rotator 56 appear the components of the difference vector (s$-e_m$) which are designated with subscripts j1 and j2. According to the previous explanations, the reactive component (s$-e_m$)j2 of the differnce vector is equal to the difference $e_{j1}-e_{mj2}$ of the reactive components of the machine-emf-vector e and of the model-emf-vector $e_m$. This difference is supplied to the input of the regulator 51 and effects the follow-up of the parameter value $R_M{}^L$ in the arithmetic model circuit 50. After balancing machine and model, the reactive component $e_{j2}$ of the machine-emf-vector e agrees with the respective reactive component $e_{Mm2}$ of the model-emf-vector but nevertheless the active component of the difference vector $s-e_m$ coincides to the ohmic voltage drop $R^s \cdot i$, shown at the stator windings of the machine. Therefore, if the reactive component $(s-e_m)j1$ is superimposed upon the dividend input of the divider 58, the value which appears at the output sufficiently agrees with the stator resistance $R^s$ of the machine. This value can be fed to the flux computer 41 as a stator resistance parameter value $R_m{}^s$. To feed the respective rotor-resistance-parameter value $R_M{}^L$ to the flux computer it is possible e.g. on one hand to use the identification circuit previously mentioned according to FIG. 4, comprising the vector analyzers 25 and 26 and the integral regulator 24. On the other hand it is possible to feed to the flux computer 41 the output value of the rotor-resistance parameter regulator 51 corresponding to the indentification rotor resistance $R^L$. The elements 24, 25, 26 are then omitted and the circuit shown in FIG. 7 is obtained.

Compared to the known device, where the information required for the converter control is formed over the machine flux vector by means of a voltage model, the device according to the invention permits to use the current model, which is superior to the voltage model at low speeds, whereby misadjustment of the resistance parameters, with the resulting miscalculation of the flux vector is avoided by the use of the flux vector according to the invention.

We claim:

1. Apparatus for operating a converted asynchronous electric motor which comprises:
  (a) a flux computer for determining the position of the flux vector from the input values for the stator voltage provided by said motor by solving all the electrical quantities of the Park equations describing said motor in a given position of the rotor axis, taking into acount the parameter values corresponding to the rotor resistance and the stator resistance of said motor whereby signals corresponding to the position of the flux vector and belonging to a solution, can be tapped from said flux computer, said flux computer comprising:
    (1) first feeding means for feeding the input value for the actual stator voltage to the computer;
    (2) second feeding means for feeding an input value for the actual rotor position to the computer;
    (3) first storage means for storing the rotor resistance parameter; and
    (4) second storage means for storing the stator resistance parameter;
  (b) a converter control unit coupled to said flux computer and said converter rectifier respectively, forming the control quantities for driving the converter rectifier from the determined position of the flux vector and from the nominal input values which fix the components of the stator current vector parallel and perpendicular to the flux vector.

2. Apparatus according to claim 1, wherein the flux computer comprises a first input for inducing a variable parameter value for the rotor resistance.

3. Apparatus according to claim 2, wherein said flux computer comprises:
  a first output for tapping a first quantity defining the stator current vector determined in said flux computer and belonging to a solution of the Park equations,
  quantity forming means connected to said motor forming a second quantity from the stator currents defining the stator current vector of said motor,
  difference forming means coupled to the first output of said flux computer and coupled to said second quantity forming means provided to form the difference of the two quantities, and
  an integral regulator having an output connected to the first input of said flux computer and having an input connected to said difference forming means.

4. Apparatus according to claim 2 and comprising:
  an emf-detector coupled to said motor for determining from the stator current and the stator voltage an emf-defining quantity of said motor,
  an arithmetic model circuit coupled to said emf-detector for simulating the processes leading to the formation of the magnetic flux by starting from said stator current, the rotor position of said motor and an adjustable parameter value for the motor resistance, and for computing a model flux vector,
  an arithmetic stage coupled to said emf-detector and to said arithmetic model circuit respectively, for computing the difference of the quantity defining the motor emf, and of a quantity defining the model emf, and
  a rotor resistance parameter regulator having an input coupled to said arithmetic stage and fed by the difference and having an output coupled to said arithmetic model circuit and to said flux computer.

5. Apparatus according to claim 4, wherein the arithmetic model circuit includes means with at least one vector rotator and one subtractor arranged for forming the difference of the magnitudes of the emf-vector formed by the emf-detector and of the emf-vector formed by differentiation means from the model flux vector, that resulting difference serving as the difference of the defining quantities.

6. Apparatus according to claim 4, wherein the arithmetic model circuit includes means with at least one vector rotator and one subtractor arranged for forming the component perpendicular to the stator current vector of the difference of the emf-vector formed by the emf-detector and an emf-model vector formed by differentiation means from the flux vector, that component serving as the difference of the defining quantities.

7. Apparatus according to claim 6, wherein the emf-detector includes means for forming the summation vector by forming the difference between the stator voltage vector and the induction stray voltage that summation vector comprises the emf and the ohmic stator voltage drop, and means for feeding that summation vector for the emf-vector.

8. Apparatus according to any one of claims 1 through 7, wherein the flux computer comprises a second input for feeding in an adjustable parameter value for the stator resistance of the machine.

9. Apparatus according to claim 8 comprising an arithmetic element coupled to the input of the flux computer for forming a temperature dependent stator resistance parameter value by correcting a temperature independent output value with a temperature correcting function.

10. Apparatus according to claim 7 comprising
  means included in the arithmetic circuit for forming the difference of the parallel components of the summation vector which are parallel to stator current by means of the subtractor and the vector rotator and a divider including a dividend input coupled to an output of the arithmetic model circuit for receiving the difference and a divisor input provided for feeding in the magnitude of the stator current vector formed by means of the sector current and an output superimposed on the input of the flux computer for the stator resistance parameter.

11. Apparatus according to any one of 1-7 9, and 10 flux computer comprises:

a flux unit for computing the flux vector in the rotor related coordinates by taking into account the rotor resistance parameter, a coordinate transformer coupled to the flux computing element for converting the flux vector given in the rotor related coordinates to stator related coordinates according to the fed in rotor position signals, a differentiation unit coupled to the coordinate transformer for computing from the stator related coordinates the respective stator related components of the emf-vector, a current computing unit coupled to the differentiation circuitry for determining the stator current vector from the emf-vector and the stator voltage vector superimposed on the emf-vector by taking into account the stator resistance parameter and a coordinate transformer coupled by its input to the current computing unit and coupled by its output to the flux computing unit for transforming the stator-related components of the stator current vector into rotor-related components according to the fed in rotor position signals.

12. Apparatus according to claim 11 wherein the flux computing unit comprises:

a plurality of computing branches according to the components of the vector, each branch comprising an amplifier with a feedback circuit which includes a first resistor having a value proportional to the main inductance and a capacitor arranged in series to the first resistor and adjusted to a value proportional to the reciprocal value of the rotor resistance parameter value and a second resistor having a value proportional to the straight inductance and arranged parallel to the serial arrangement of the first resistor and the capacitor.

13. Apparatus according to claim 11 wherein the current computing unit comprises:

a plurality of computing branches according to the components of the vector, each branch having an amplifier with a feedback circuit which includes a capacitor and a parallel arranged resistor, the capacitor representing the stator stray inductance and the resistor representing the reciprocal value of the stator resistance, the resistor being adjustable according to the stator resistance parameter value.

14. Apparatus according to claim 8 comprising means included in the arithmetic circuit for forming the difference of the parallel components of the summation vector which are parallel to the stator current by means of the substractor and the vector rotor and a divider including a divident input coupled to an output of the arithmetic model circuit for receiving the difference and the divisor input provided for feeding in the magnitude of the stator current vector formed by means of the sector current and an output superimposed on the input of the flux computer for the stator resistance parameter.

15. Apparatus according to claim 8, wherein the flux computer comprises:

a flux unit for computing the flux vector in the rotor related coordinates by taking into account the rotor resistance parameter, a coordinate transformer coupled to the flux computing element for converting the flux vector given in the rotor related coordinates to stator related coordinates according to the fed in rotor position signals, a differentiation unit coupled to the coordinate transformer for computing from the stator related coordinates the respective stator related components of the emf-vector, a current computing unit coupled to the differentiation circuitry for determining the stator current vector for the emf-vector and the stator voltage superimposed on the emf-vector by taking into account the stator resistance parameter and a coordinate transformer coupled by its input to the current computing unit and coupled by its output to the flux computing unit for transforming the stator-related components of the stator current vector into rotor-related components according to the fed in rotor position signals.

16. Apparatus according to claim 12 wherein the current computing unit comprises:

a plurality of computing branches according to the components of the vector, each branch having an amplifier with a feedback circuit which includes a capacitor and a parallel arranged resistor, a capacitor representing the stator stray inductance and the resistor representing the reciprocal value of the stator resistance, the resistor being adjustable according to the stator resistance parameter value.

* * * * *